ement is connected at opposite sides to the scoop and

(12) United States Patent
Schuelke

(10) Patent No.: US 9,055,844 B2
(45) Date of Patent: Jun. 16, 2015

(54) UTENSIL WITH SCOOP AND FUNNEL FOR TRANSFERRING INGREDIENTS

(71) Applicant: Evan Eric Schuelke, Beale AFB, CA (US)

(72) Inventor: Evan Eric Schuelke, Beale AFB, CA (US)

( * ) Notice: Subject to any disclaimer, the term of this patent is extended or adjusted under 35 U.S.C. 154(b) by 120 days.

(21) Appl. No.: 14/020,428

(22) Filed: Sep. 6, 2013

(65) Prior Publication Data

US 2015/0069092 A1    Mar. 12, 2015

(51) Int. Cl.
| | |
|---|---|
| *B65D 88/26* | (2006.01) |
| *A47J 43/28* | (2006.01) |
| *A47F 13/08* | (2006.01) |
| *G01F 19/00* | (2006.01) |
| *B65D 25/48* | (2006.01) |
| *A47J 36/14* | (2006.01) |

(52) U.S. Cl.
CPC ............... *A47J 43/28* (2013.01); *A47F 13/08* (2013.01); *G01F 19/002* (2013.01); *B65D 25/48* (2013.01); *A47J 36/14* (2013.01)

(58) Field of Classification Search
CPC ......... B65D 25/48; B65D 88/28; A47J 36/14; A23G 9/283; B30B 15/304; B65B 67/04; B65B 3/26

USPC ........... 222/460, 461, 462, 345, 346, 50, 356, 222/196.1, 142.2, 142.6, 142.7; 141/325, 141/328, 108, 109, 128, 280; 33/501.45, 33/326; 30/147, 148, 149, 150; 73/426
See application file for complete search history.

(56) References Cited

U.S. PATENT DOCUMENTS

| | | | | |
|---|---|---|---|---|
| 1,175,709 | A | * | 3/1916 | Cole ............................... 30/326 |
| 2,259,504 | A | * | 10/1941 | Wilson et al. ................... 73/426 |
| 4,788,862 | A | | 12/1988 | Fuller |
| 6,974,056 | B2 | | 12/2005 | Rea |
| 7,441,676 | B2 | | 10/2008 | Pickering, Jr. |
| 7,637,417 | B2 | | 12/2009 | Fite, IV et al. |
| 2009/0107581 | A1 | | 4/2009 | Sayage |
| 2010/0154538 | A1 | * | 6/2010 | Ricely ............................. 73/427 |

OTHER PUBLICATIONS

International Search Report dated Dec. 30, 2014 from corresponding international application PCT/US2014/054350 USPTO PCT Division/ Authorized Officer Blaine R. Copenheaver.

* cited by examiner

*Primary Examiner* — Kevin P Shaver
*Assistant Examiner* — Stephanie E Williams
(74) *Attorney, Agent, or Firm* — Plager Schack LLP

(57) ABSTRACT

Some embodiments of the invention provide a novel utensil for transferring ingredients into a container with a small opening and for minimizing ingredient spillage during the transfer. In some embodiments, the utensil comprises a hollowed-out scoop, a cover that folds over the scoop to cover ingredients in the scoop, a funnel through the bottom of the fold-over cover, a handle for orienting the scoop, a hinged element that is connected at opposite sides to the scoop and the cover at a scooping end of the hinged element and is connected to the handle at the other end of the hinged element.

10 Claims, 2 Drawing Sheets

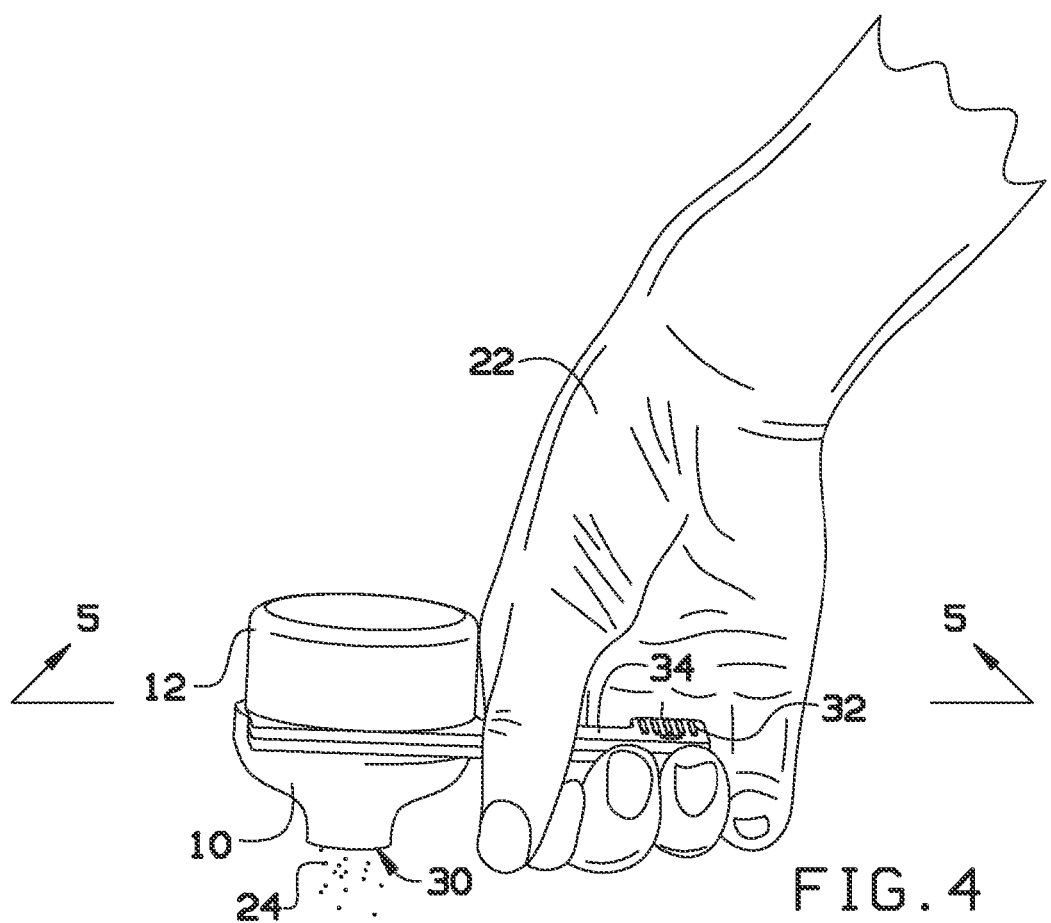
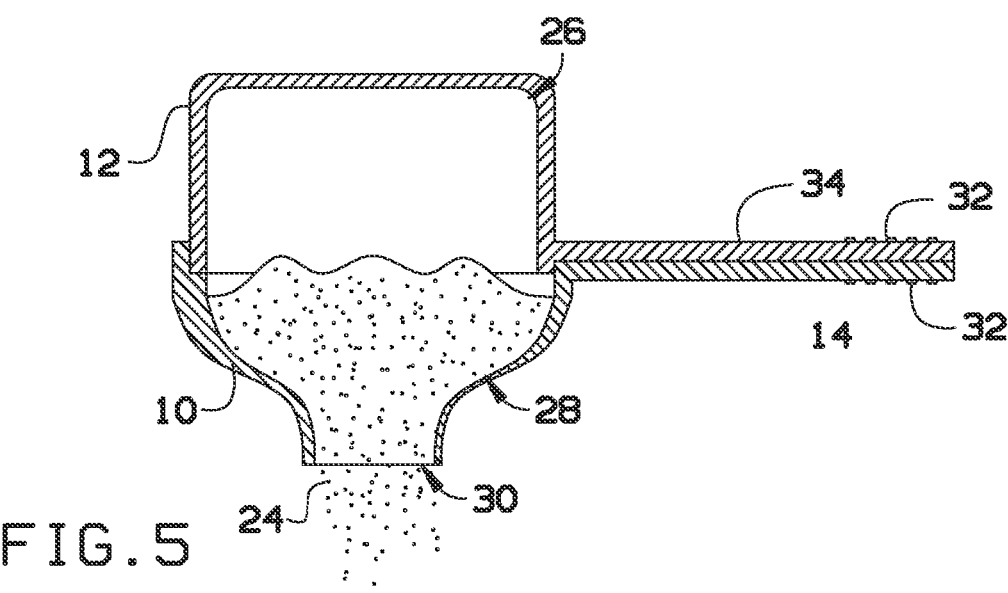

UTENSIL WITH SCOOP AND FUNNEL FOR TRANSFERRING INGREDIENTS

BACKGROUND

The embodiments herein relate generally to utensils that can be used to transfer food ingredients from a source location of the ingredients to a container for the ingredients. Of course, the embodiments of the invention herein may also be used to transfer other non-food items including animal and livestock feed, specimens, science materials, fertilizers, seeds, etc.

Utensils and other devices that have been used to transfer ingredients have been inconsistent at transferring without spilling the ingredients. For instance, when using a scooper to transfer a supply of various ingredients into a narrow opening of a container, a person might choose a scooper with a large scoop to maximize the supply of ingredients being transferred for each scoop. Yet with a narrow opening for the container, the person must be ultra-careful pouring the ingredients into the container, lest some of the ingredient supply will spill over the sides of the container. This is problematic for those who need to quickly transfer ingredients without spilling.

Some ingredient transferring utensils have used a scoop with a funnel to feed the small opening of a container. Yet, some of the supply of the ingredients typically ends of spilling over the sides of the scoop or simply as a result of a person's jittery hand movement while holding the scoop. Ultimately, this leaves a mess that requires additional work for the person transferring the ingredients. Moreover, the use of a funnel on one or the other side of a scoop leads inevitably to some ingredients being spilled. For example, an athlete may attempt to add protein powder to a bottle of water, yet the opening of the water bottle may be approximately the diameter of a thumb, and thus, simply trying to fit a side funnel in the opening while dumping the protein powder down the funnel is highly challenging. Thus, great care must be employed while transferring ingredients to containers with small openings, even when a funnel is used along the side of the scoop.

Prior art scooping utensils have not been able to solve the problems with transferring ingredients into containers with small openings. United States Patent Application Publication 2009/0107581 discloses a device with a scoop and a funnel with no cover for the ingredients in the scoop and no fold-over of the funnel to cover the scoop. U.S. Pat. No. 6,971,056 discloses an apparatus with a top cup and bottom funnel with ingredients in the bottom that are shaved off by sliding the top over the bottom. United States Patent Application Publication 2008/0099512 discloses a device for measuring, transferring, and dispersing a liquid or powder substance but does not have fold-over covering of the substance.

Thus, what is needed is a utensil that includes a scooper and a funnel that fold-over to cover ingredients in the scooper in order to provide scooping ability and reduce ingredient spillage.

BRIEF SUMMARY

Some embodiments of the invention provide a novel utensil for transferring ingredients into a container with a small opening and for minimizing ingredient spillage during the transfer. In some embodiments, the utensil comprises a hollowed-out scoop, a cover that folds over the scoop to cover ingredients in the scoop, a funnel through the bottom of the fold-over cover, a handle for orienting the scoop, a hinged element that is connected at opposite sides to the scoop and the cover at a scooping end of the hinged element and is connected to the handle at the other end of the hinged element.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matters can be embodied in other specific forms without departing from the spirit of the subject matters.

BRIEF DESCRIPTION OF THE DRAWINGS

Having described the invention in general terms, reference is now made to the accompanying drawings, which are not necessarily drawn to scale, and wherein:

FIG. 4 conceptually illustrates a side perspective view of an example scoop and funnel utensil of some embodiments while in use.

FIG. 5 conceptually illustrates a sectional view of the example scoop and funnel utensil along line 5-5 in FIG. 4.

DETAILED DESCRIPTION

In the following detailed description, several examples and embodiments of the invention are described. However, it will be clear to a person skilled in the art that the invention is not limited to the embodiments set forth and can be adapted for any of several other uses.

Some embodiments of the invention provide a novel utensil for transferring ingredients into a container with a small opening and for minimizing ingredient spillage during the transfer. In some embodiments, the utensil comprises a hollowed-out scoop, a cover that folds over the scoop to cover ingredients in the scoop, a funnel through the bottom of the fold-over cover, a handle for orienting the scoop, a hinged element that is connected at opposite sides to the scoop and the cover at a scooping end of the hinged element and is connected to the handle at the other end of the hinged element.

Figure 1:
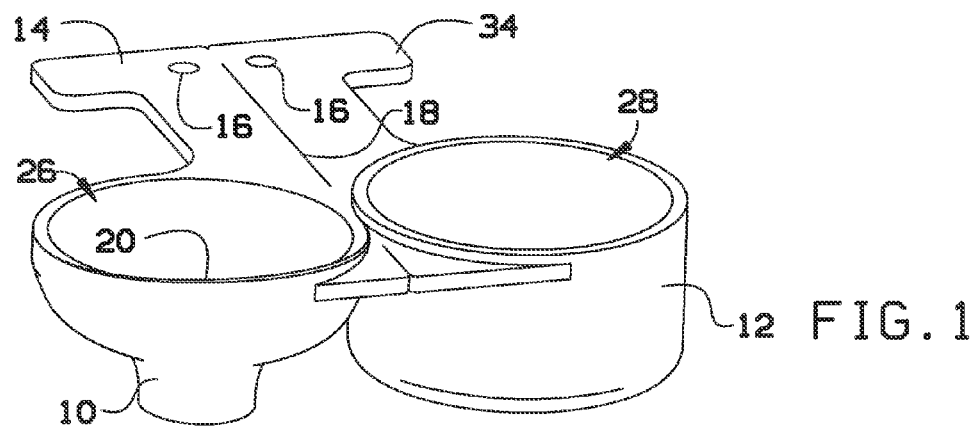
FIG. 1 conceptually illustrates a forward perspective view of an example scoop and funnel utensil of some embodiments.

FIG. 1 conceptually illustrates a forward perspective view of an example scoop and funnel utensil of some embodiments. As shown, the scoop and funnel utensil includes a funnel 10, a scoop 12, a funnel handle 14, a pair of handle holes 16, a live hinge 18, a funnel overlap rim 20, a scoop cavity 26, a funnel cavity 28, and a scoop handle 34. The scoop 12 is used to scoop up various ingredients. Then the funnel 10 is folded over along the live hinge 18 to cover the contents of the scoop 12. By combining a scooper and funnel into one article, with their connection being foldable and/or hinged, a person can scoop various ingredients and then fold the similarly sized funnel over the scooped ingredients in almost a single movement. This allows for a smooth transfer into a narrow opening of some containers, thereby reducing the occurrence of messy spills.

The scoop and funnel utensil in some embodiments is made from a durable but pliable material, such as plastic. A plastic injection molding or a similar process can be used to construct the scoop and funnel, with a thinner center line along the handle for easy fold-over along the hinge 18. In other embodiments, a pressed or stamped metal could be used for ultimate durability and to handle materials not suited for containment in plastic. The sizes of the scoop and funnel are approximately the same, but can both vary by equal proportion for different embodiments that are suited for scooping and transferring greater supplies or lesser supplies of ingredients or source materials. Regardless of the unit size, the opening on the funnel is slightly greater in diameter than the opening of the scoop, in order to accommodate the funnel overlap rim 20. Paired holes 16 can be used for any of several needs, including affixing store labels, threading a string to hold the scoop and funnel utensil, or for use of a lanyard.

Figure 2:
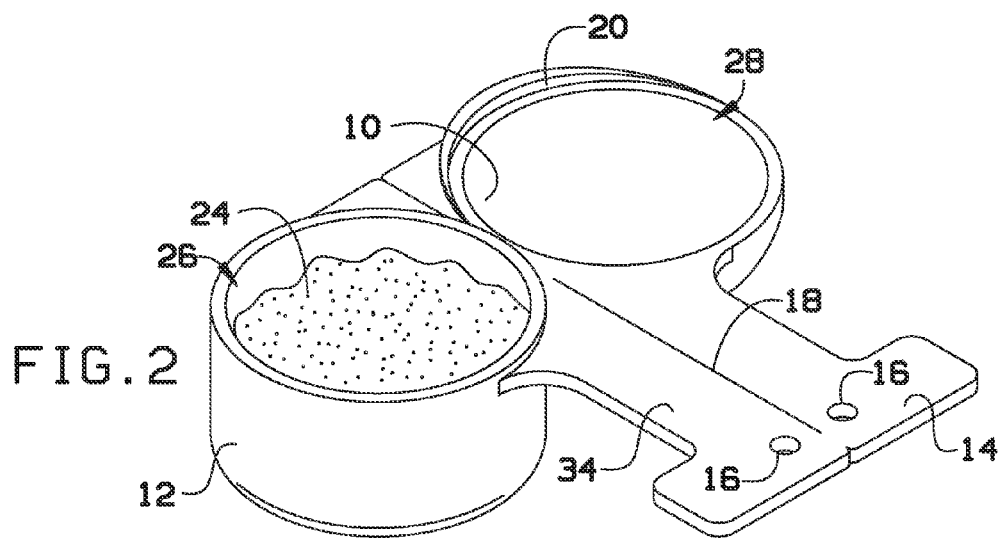
FIG. 2 conceptually illustrates a rear perspective view of the example scoop and funnel utensil shown in FIG. 1.

FIG. 2 conceptually illustrates a rear perspective view of the example scoop and funnel utensil shown in FIG. 1. As shown, the scoop and funnel utensil further includes ingredients 24. Although the example ingredients filled in the scoop cavity 26 does not exceed the fill line of the scoop 12, in some cases, a person may scoop up more ingredients than the capacity of the scoop cavity 26. Thus, any cover that is to be applied must cover over the top of heaping ingredients filled up in the scoop cavity 26.

Figure 3:
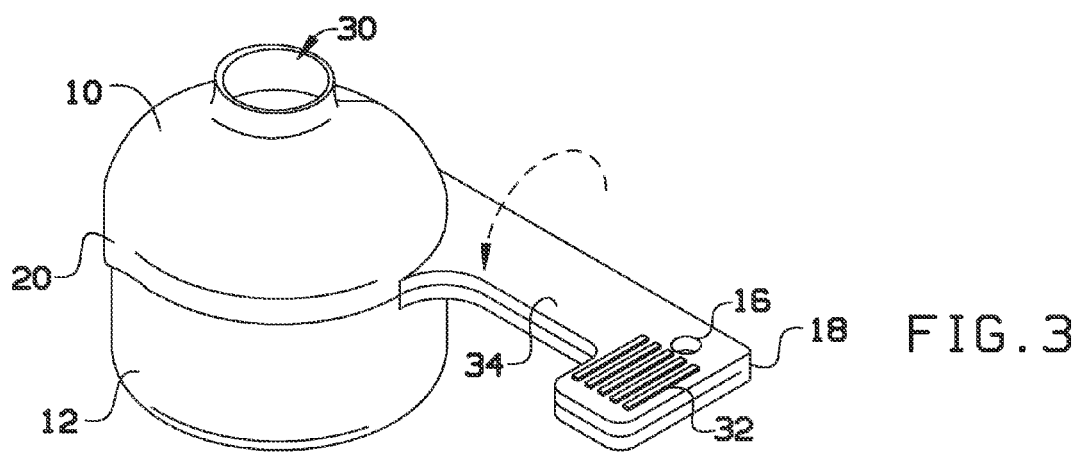
FIG. 3 conceptually illustrates the example scoop and funnel utensil of FIG. 2, shown in a closed cover configuration.

FIG. 3 conceptually illustrates the example scoop and funnel utensil of FIG. 2, shown in a closed cover configuration. As shown in this figure, the scoop and funnel utensil is closed with the funnel 10 covered over the top of the ingredients 24 that were scooped into the scoop cavity 26 of the scoop 12. The funnel overlap rim 20 seals the ingredients inside the closed scoop and funnel utensil. Moreover, the scoop handle 34 folds over onto itself along the live hinge 18, revealing grip thread 32 on the handle and lining up the pair of handle holes 16 onto each other. As can be seen, the scoop and funnel utensil, when closed with a supply of ingredients inside, can be used with any kind of container having a small opening, so long as the funnel opening 30 fits into or over the small opening of the container.

When the ingredient filled scoop utensil is flipped over, the contents will pour out the funnel 10. All the user of the utensil needs to do is make sure that the funnel is near or inside an opening of the container into which the ingredients will be deposited.

FIG. 4 conceptually illustrates a side perspective view in some embodiments of the example scoop and funnel utensil while in use. As shown in this figure, a person is holding the scoop and funnel utensil upside down. Thus, the funnel 10 appears in this figure beneath the scoop 12, with ingredients 24 being dispensed out of the funnel opening 30 while the person is holding the folded handle 34 and taking grip along the grip thread 32. By using the scoop and funnel utensil in its flipped over configuration, the person does not spill any of the ingredients over the sides of the scoop or funnel. Furthermore, the person is unlikely to spill ingredients over the sides of the container because the funnel opening 30 is narrow enough to fit most openings of containers. For example, an athlete can easily add protein powder to a bottle of water without spilling the power because the narrow funnel opening 30 is almost certain to fit into the water bottle cap opening. Even if the fit is not perfect, the scoop and funnel utensil could be held just over the top of the opening to carefully allow the ingredients 24 to be released into the container.

The container into which the ingredients are poured can be any of several containers with small openings, such as a water bottle, a baby bottle, a test tube, etc. FIG. 5 conceptually illustrates a sectional view of the example scoop and funnel utensil along line 5-5 in FIG. 4, while the ingredients are being poured out. As shown in this figure, the scoop 12 resides above the funnel 10, with the scoop handle 34 folded over onto the funnel handle 14 and the grips 32 present on each side of the handle 34. At this stage, the ingredients 24 that had previously filled the scoop cavity 26 are primarily contained down in the funnel cavity 28. Note that the scoop cavity 26 is presently free of any of the ingredients 24, yet none of the ingredients have spilled over the sides of the scoop 12 or funnel 10. Instead, the ingredients 24 are being actively dispensed through the funnel opening 30.

Thus, when used as shown by reference to FIGS. 4-5, a person is able to fill the scoop 12 with ingredients, close the funnel 10 over the top of the scoop 12 along the active hinge 18 so that the handle can be used by the person to flip the funnel 10 side over to release the ingredients 24 through the funnel opening 30 and into the opening of the person's container.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

I claim:

1. A scoop and funnel utensil for scooping ingredients to dispense through a small opening of a container, the scoop and funnel utensil comprising:
    a scoop comprising a scoop cavity suitable for scooping up a supply of ingredients;
    a funnel that fits over the top of the scoop and covers the supply of ingredients, the funnel comprising a funnel opening for dispensing the supply of ingredients and a funnel cavity suitable for holding the ingredients in a manner that releases portions of the supply of ingredients in a steady stream through the funnel opening; and
    a handle comprising a first panel connected to the scoop and a second panel connected to the funnel, wherein said first panel is longitudinally connected to said second panel by a hinge permitting the first panel and the scoop to rotate in relation to the second panel and the funnel allowing the funnel to fit over the top of the scoop when in a closed position.

2. The scoop and funnel utensil of claim 1, wherein the handle further comprises grips for holding the handle.

3. The scoop and funnel utensil of claim 1, wherein the handle further comprises a pair of holes for threading a string to hang the scoop and funnel utensil.

4. The scoop and funnel utensil of claim 1, wherein the handle is configured to flip the scoop and funnel utensil when in the closed position.

5. The scoop and funnel utensil of claim 4, wherein the ingredients in the scoop cavity are transferred to the funnel cavity when the scoop and funnel utensil is flipped in the closed position.

6. The scoop and funnel utensil of claim 5, wherein a stream of the transferred ingredients is dispensed through the funnel opening from the funnel cavity.

7. The scoop and funnel utensil of claim 5, wherein a portion of the transferred ingredients is dispensed through the funnel opening from the funnel cavity when a user holding the handle shakes the scoop and funnel utensil.

8. The scoop and funnel utensil of claim 1, wherein the funnel opening is circular.

9. The scoop and funnel utensil of claim 1, wherein the funnel further comprises a funnel overlap rim for sealing a connection between the funnel and the scoop when the funnel is positioned over the top of the scoop.

10. The scoop and funnel utensil of claim 9, wherein the sealed connection between the funnel and the scoop reduces spillage of the ingredients when flipping the scoop and funnel utensil.

\* \* \* \* \*